E. GARRETSON.
ATTACHMENT FOR MICROSCOPES.
APPLICATION FILED OCT. 16, 1911. RENEWED MAY 31, 1918.
1,294,255.
Patented Feb. 11, 1919.
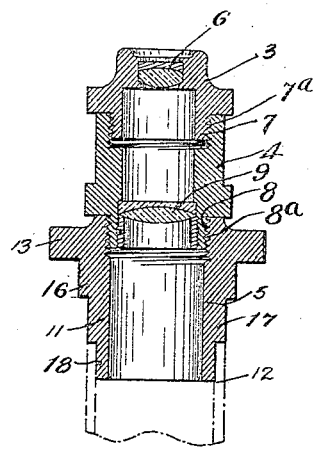

UNITED STATES PATENT OFFICE.

EUGENE GARRETSON, OF BUFFALO, NEW YORK.

ATTACHMENT FOR MICROSCOPES.

1,294,255. Specification of Letters Patent. Patented Feb. 11, 1919.

Application filed October 16, 1911, Serial No. 654,961. Renewed May 31, 1918. Serial No. 237,624.

*To all whom it may concern:*

Be it known that I, EUGENE GARRETSON, of the city of Buffalo, county of Erie, and State of New York, have invented certain new and useful Improvements in Attachments for Microscopes, of which the following is a full, clear, and exact description.

Heretofore eye pieces have been constructed with lenses which were neither achromatic nor corrected for spherical aberration with the result that the images formed, particularly with the higher power eye pieces were cloudy and indistinct, no matter how perfectly corrected the objective used with the eye piece might be.

The images formed by the objective being subjected to a secondary process of magnification by the eye piece, however perfect the initial image, the secondary image will show imperfections and cloudiness unless the aberrations of the eye piece be also perfectly corrected.

The object of this invention is to overcome and correct the deficiencies above mentioned and to supply an eye piece for use with optical instruments which will give clear and distinct images at all degrees of magnification and permit a higher degree of secondary magnification than would be practically obtainable with the former types of eye pieces where the images formed are cloudy and indistinct, even at the usual degree of magnification. It is further my object to provide an eye piece which may be adapted to give several powers of secondary magnification and which may be applied to any of the standard styles of optical instruments, and which may, moreover, be adapted to give a large field or small field as desired. This and other advantages which will result from the use of my invention will be clearly understood by those skilled in the art from the drawings and description which form part of this application.

The figure of the drawings shows a longitudinal, sectional elevation of my invention.

3 is a lens mounting; 4 is an intermediate lens mounting; 5 is a body portion of the eye piece.

The lens mounting 3 carries an achromatic lens 6 suitably mounted in the upper portion thereof. The lower end of the mounting 3 is suitably provided with a threaded portion 7 which screws into either the top portion of the intermediate mounting 4 or the top portion of the body 5 as may be desired.

The intermediate lens mounting 4 is provided at one end with internal threads $7^a$ to which the mounting 3 may be secured and at its lower end is provided in its reduced portion 8 with external threads which may engage with the internal threads $8^a$ at the upper end of the body portion 5. This intermediate lens mounting 4 carries in a suitable recess provided at its lower end an achromatic lens 9 which is retained and held in position by a suitably threaded collar 10.

The body portion 5 is provided at its upper end with internal screw-threads $8^a$ and a cylindrical lower portion 11, which is provided with a plurality of cylindrical sections 16, 17 and 18 of different diameters, any one of which may be slipped into the draw tube 12 of an optical instrument (indicated by dotted lines), thus making the body portion adaptable for use with draw tubes of different internal diameters. The upper end of the body portion is provided with a flange 13 which may be knurled or otherwise fitted to the instrument for convenience in handling. The shoulders formed by the cylindrical sections act as stops to limit the entrance of the body portion into the draw tube 12.

Of course it is evident that the body portion 5 may be used interchangeably with either or both of the lens mountings 3 and 4, as long as the internal diameter of the draw tube to which the eye piece is applied is not greater than the lower cylindrical portion of the body 5.

When it is desired to use my eye piece, the lens mounting 3 may be secured to the upper end of the mounting 4 and the mounting 4 secured to the upper end of the body portion 5 and when so united the eye piece constitutes the normal combination of my invention. Of course it is to be understood that the distance between the lenses 6 and 9 may be as long or short as desired to conform with the laws of optics well known to those skilled in the art. Likewise the focal length of the lenses 6 and 9 may be varied in accordance with the above referred to laws.

It will be noted that the lenses 6 and 9 are shown as composed of two elements which make them achromatic, but it will be understood that any plural combination of parts which will produce suitable results may be used instead of that specifically shown in the drawings and the same advantageous results obtained by such use may be obtained as by the use of the parts shown and described herein.

When it is desired to vary the size of the visual field or vary the degree of magnification from that which is obtained by the normal form of my invention, the mounting 3 carrying the lens 6 may be attached directly to the body portion 5 or removed entirely and the lens mounting 4 used alone attached to the body portion 5.

It is evident that the distance between the lenses 6 and 9 as well as the distance between the optical parts of the eye piece and the objective of the instrument to which the eye piece is attached may be adjusted by means of the threaded portion of the eye piece if so desired.

Those skilled in the art will understand that my invention is adapted for use with microscopes, telescopes and other kinds of optical instruments and that it may be applied to any style or specific form of the various kinds of such optical instruments.

It is understood that some modifications may be made of the mechanical construction and of the parts shown and described herein and still be within the purview or scope of the appended claim and I do not wish to be limited to the precise construction shown and described.

What I claim is:

An adapter for microscopes, comprising a body portion formed with a cylindrical part having a plurality of cylindrical portions of different diameters, said body portion being provided internally with a standard screw-thread to receive microscope objectives.

In testimony whereof, I have hereunto set my hand in the presence of two subscribing witnesses.

EUGENE GARRETSON.

Witnesses:
J. WM. ELLIS,
WALTER H. KELLEY.